(12) United States Patent
Xia

(10) Patent No.: US 11,082,239 B2
(45) Date of Patent: *Aug. 3, 2021

(54) ACCELERATING TRANSACTION DELIVERIES IN BLOCKCHAIN NETWORKS USING TRANSACTION RESENDING

(71) Applicant: Advanced New Technologies Co., Ltd., Grand Cayman (KY)

(72) Inventor: Ning Xia, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,396

(22) Filed: Jul. 31, 2020

(65) Prior Publication Data

US 2020/0366502 A1 Nov. 19, 2020

Related U.S. Application Data

(63) Continuation of application No. 16/422,198, filed on May 24, 2019, which is a continuation of application No. PCT/CN2018/124894, filed on Dec. 28, 2018.

(51) Int. Cl.
*H04L 29/06* (2006.01)
*H04L 9/32* (2006.01)

(52) U.S. Cl.
CPC .......... *H04L 9/3247* (2013.01); *H04L 9/3236* (2013.01); *H04L 2209/38* (2013.01)

(58) Field of Classification Search
CPC .. H04L 9/3247; H04L 2209/38; H04L 9/3238
See application file for complete search history.

(56) References Cited

U.S. PATENT DOCUMENTS 5,889,943 A 3/1999 Ji et al.
7,844,729 B1 * 11/2010 Friedman ................ H04L 41/12
709/238

(Continued)

FOREIGN PATENT DOCUMENTS

CN 106385319 A 2/2017
CN 107239910 A 10/2017
(Continued)

OTHER PUBLICATIONS

European Extended Search Report in European Patent Application No. 18866178.9, dated Jun. 15 2020, 7 pages.

(Continued)

*Primary Examiner* — John B King
*Assistant Examiner* — Darshan I Dhruv
(74) *Attorney, Agent, or Firm* — Fish & Richardson P.C.

(57) ABSTRACT

In a blockchain transaction acceleration system, receive a first transaction sent through a first node in a blockchain. At least one second transaction that is a duplicate of the first transaction is received in the blockchain transaction acceleration system, where the at least one second transaction sent by the first node to at least one second node in the blockchain is different from the first node. The blockchain transaction acceleration system executes a first-received transaction among received transactions that include the first transaction and the at least one second transaction. Upon determining, by the blockchain transaction acceleration system, that remaining transactions of the received transactions are identical to the first-received transaction, discarding the remaining transactions.

17 Claims, 11 Drawing Sheets

(56) References Cited

U.S. PATENT DOCUMENTS

| | | | |
|---|---|---|---|
| 8,756,217 B2 | 6/2014 | Peek | |
| 10,102,265 B1* | 10/2018 | Madisetti | G06Q 20/06 |
| 10,325,084 B1* | 6/2019 | Larimer | H04L 9/3247 |
| 10,505,708 B2 | 12/2019 | Xia | |
| 10,664,469 B2 | 5/2020 | Xia | |
| 2008/0253386 A1* | 10/2008 | Barum | H04L 45/00 370/406 |
| 2009/0100128 A1 | 4/2009 | Czechowski, III et al. | |
| 2009/0225676 A1* | 9/2009 | Kisela | H04L 1/24 370/252 |
| 2012/0257626 A1* | 10/2012 | McGhee | H04L 43/028 370/392 |
| 2013/0159724 A1* | 6/2013 | Kim | H04L 9/0819 713/181 |
| 2015/0046558 A1* | 2/2015 | Padgett | H04L 45/121 709/217 |
| 2016/0086175 A1* | 3/2016 | Finlow-Bates | G06Q 20/401 705/77 |
| 2016/0261690 A1 | 9/2016 | Ford | |
| 2017/0034213 A1* | 2/2017 | Murgia | H04L 63/02 |
| 2017/0132625 A1 | 5/2017 | Kennedy | |
| 2017/0132626 A1* | 5/2017 | Kennedy | G06Q 20/401 |
| 2017/0236120 A1 | 8/2017 | Herlihy et al. | |
| 2017/0345011 A1 | 11/2017 | Salami et al. | |
| 2018/0097779 A1 | 4/2018 | Karame et al. | |
| 2018/0165476 A1* | 6/2018 | Carey | G06F 21/577 |
| 2018/0225448 A1 | 8/2018 | Russinovich et al. | |
| 2018/0254982 A1 | 9/2018 | Apostolopoulos et al. | |
| 2018/0294955 A1 | 10/2018 | Rhie et al. | |
| 2018/0294967 A1 | 10/2018 | Roberts et al. | |
| 2018/0341930 A1 | 11/2018 | Moir et al. | |
| 2019/0018284 A1 | 1/2019 | Masamoto et al. | |
| 2019/0018984 A1* | 1/2019 | Setty | H04L 63/14 |
| 2019/0035014 A1 | 1/2019 | Bell et al. | |
| 2019/0080407 A1* | 3/2019 | Molinari | G06Q 20/223 |
| 2019/0114626 A1 | 4/2019 | Pogorelik et al. | |
| 2019/0129895 A1* | 5/2019 | Middleton | H04L 63/12 |
| 2019/0182284 A1* | 6/2019 | Signorini | G06F 21/602 |
| 2019/0188711 A1 | 6/2019 | Wu et al. | |
| 2019/0236598 A1* | 8/2019 | Padmanabhan | G06Q 20/4016 |
| 2019/0278766 A1 | 9/2019 | Xia | |
| 2019/0280852 A1 | 9/2019 | Xia | |
| 2019/0280878 A1 | 9/2019 | Xia | |
| 2019/0340267 A1 | 11/2019 | Vo et al. | |
| 2019/0370486 A1 | 12/2019 | Wang et al. | |
| 2020/0027067 A1* | 1/2020 | Hertzog | H04L 9/3239 |
| 2020/0052996 A1 | 2/2020 | Zhu et al. | |
| 2020/0067696 A1 | 2/2020 | Sarin | |
| 2020/0143466 A1* | 5/2020 | Wu | H04L 9/3239 |
| 2020/0145185 A1 | 5/2020 | Xia | |
| 2020/0226125 A1 | 7/2020 | Xia | |
| 2020/0364213 A1 | 11/2020 | Xia | |

FOREIGN PATENT DOCUMENTS

| | | | |
|---|---|---|---|
| CN | 107239954 | | 10/2017 |
| CN | 107332826 A | | 11/2017 |
| CN | 107358420 | | 11/2017 |
| CN | 107862600 A | | 3/2018 |
| CN | 108154367 | | 6/2018 |
| CN | 108700210 A | | 6/2018 |
| CN | 108769141 A | | 11/2018 |
| CN | 108805702 A | | 11/2018 |
| CN | 108876361 A | | 11/2018 |
| CN | 108876615 A | | 11/2018 |
| CN | 109064337 | | 12/2018 |
| CN | 108604344 | | 9/2019 |
| JP | 2007019852 | | 1/2007 |
| JP | 2012070293 | | 4/2012 |
| WO | WO 2008126210 | | 10/2008 |
| WO | WO 2017109140 A1 | | 6/2017 |
| WO | WO 2017167550 A1 | | 10/2017 |
| WO | WO 2018223995 | | 12/2018 |
| WO | WO 2018224942 | | 12/2018 |
| WO | WO-2018224942 A1 * | 12/2018 | H04L 12/811 |
| WO | WO 2018224954 | | 12/2018 |
| WO | WO 2018231255 | | 12/2018 |
| WO | WO 2018234987 A1 | | 12/2018 |

OTHER PUBLICATIONS

Muntadher et al, "A Bitcoin Model for Evaluation of Clustering to Improve Propagation Delay in Bitcoin Network," IEEE International Conference on Computational Science and Engineering, Aug. 24, 2016.

Crosby et al., "BlockChain Technology: Beyond Bitcoin," Sutardja Center for Entrepreneurship & Technology Technical Report, Oct. 16, 2015, 35 pages.

European Extended Search Report in European Patent Application No. 18866984.0, dated Feb. 3, 2020, 7 pages.

European Extended Search Report in European Patent Application No. 18867007.9 dated Feb. 19, 2020, 8 pages.

Nakamoto, "Bitcoin: A Peer-to-Peer Electronic Cash System," www.bitcoin.org, 2005, 9 pages.

PCT International Search Report and Written Opinion issued in International Application No. PCT/CN2018/124894 dated Sep. 26, 2019, 7 pages.

PCT International Search Report and Written Opinion issued in International Application No. PCT/CN2018/124956 dated Sep. 19, 2019, 7 pages.

PCT International Search Report and Written Opinion issued in International Application No. PCT/CN2018/124975 dated Sep. 27, 2019, 6 pages.

Lou et al, "A Multiple Blockchains Architecture on Inter-Blockchain Communication", IEEE Xplore, Jul. 20, 2018, 7 pages.

* cited by examiner

ACCELERATING TRANSACTION DELIVERIES IN BLOCKCHAIN NETWORKS USING TRANSACTION RESENDING

CROSS-REFERENCE TO RELATED APPLICATIONS

This application is a continuation of and claims the benefit of priority to U.S. patent application Ser. No. 16/422,198, filed on May 24, 2019, which is a continuation of PCT Application No. PCT/CN2018/124894, filed on Dec. 28, 2018, which are hereby incorporated by reference in their entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

In conventional blockchain systems, a transaction-sending process includes a client that generates the transaction and sends the transaction to a blockchain node. The blockchain node obtains a consensus on a batch of transactions, after which the transactions are executed one-by-one. The execution result is written to the new blockchain node. This process involves transaction network transmission, mainly accomplished by the client communicating the transaction to the blockchain node. In existing blockchain environments, direct network connections are used for communication.

However, the direct network connection between the client and the blockchain node can be less than optimal. Due to its simplicity, the direct network connection may be inefficient. The network may be incapable of adapting to handle complexities of the network. For example, the network may not be able to handle a situation in which a network problem slows communication between the nodes. Because of this inefficiency, when two network nodes in a network need to transmit data, an established direct connection may not be the fastest possible connection. The direct network connection may be inefficient or slow, for example, when the two nodes are in a cross-border network, or when the two nodes belong to different network operators. Generally, transmission times of transactions in a blockchain are random or unknown. Although direct network connections can be used for addressing these issues, a more efficient solution to address direct network connections would be advantageous.

SUMMARY

Implementations of the specification include computer-implemented methods for improving blockchain network transactions. More particularly, implementations of the specification are directed to accelerating transaction deliveries in blockchain networks using transaction resending.

In some implementations, actions include receiving, in a blockchain transaction acceleration system, a first transaction sent through a first node in a blockchain; receiving, in the blockchain transaction acceleration system, at least one second transaction that is a duplicate of the first transaction, the at least one second transaction sent by the first node to at least one second node in the blockchain is different from the first node; executing, by the blockchain transaction acceleration system, a first-received transaction among received transactions that include the first transaction and the at least one second transaction; and upon determining, by the blockchain transaction acceleration system, that remaining transactions of the received transactions are identical to the first-received transaction, discarding the remaining transactions. Other implementations include corresponding systems, apparatus, and computer programs, configured to perform the actions of the methods, encoded on computer storage devices.

These and other implementations may each optionally include one or more of the following features:

A first feature, combinable with any of the following features, wherein determining that the remaining transactions of the received transactions are identical to the first-received transaction includes identifying a digital signature of each of the remaining transactions that matches a digital signature of the first-received transaction.

A second feature, combinable with any of the previous or following features, wherein the first node in the blockchain and the at least one second node in the blockchain are within different network hubs provided by different network service providers.

A third feature, combinable with any of the previous or following features, further comprising collecting transmission speed statistics on the received transactions to determine nodes in the blockchain that provide faster transaction transmission speeds.

A fourth feature, combinable with any of the previous or following features, further comprising determining, for a given transmission-sending node and based on the transmission speed statistics, a set of preferred nodes to which transactions are to be sent.

A fifth feature, combinable with any of the previous or following features, wherein the blockchain transaction acceleration system is implemented in one or more nodes in the blockchain or in a server accessible by the blockchain.

A sixth feature, combinable with any of the previous or following features, further comprising determining a plurality of second nodes to use for sending the at least one second transaction.

The specification also provides one or more non-transitory computer-readable storage media coupled to one or more processors and having instructions stored thereon which, when executed by the one or more processors, cause the one or more processors to perform operations in accordance with implementations of the methods provided herein.

The specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the specification may include any combination of the aspects and features described herein. That is, methods in accordance with the specification are not limited to the combinations of aspects and features specifically described herein, but also include any combination of the aspects and features provided.

The details of one or more implementations of the specification are set forth in the accompanying drawings and the description below. Other features and advantages of the specification will be apparent from the description and drawings, and from the claims.

DESCRIPTION OF DRAWINGS

Like reference symbols in the various drawings indicate like elements.

DETAILED DESCRIPTION

Figure 1:
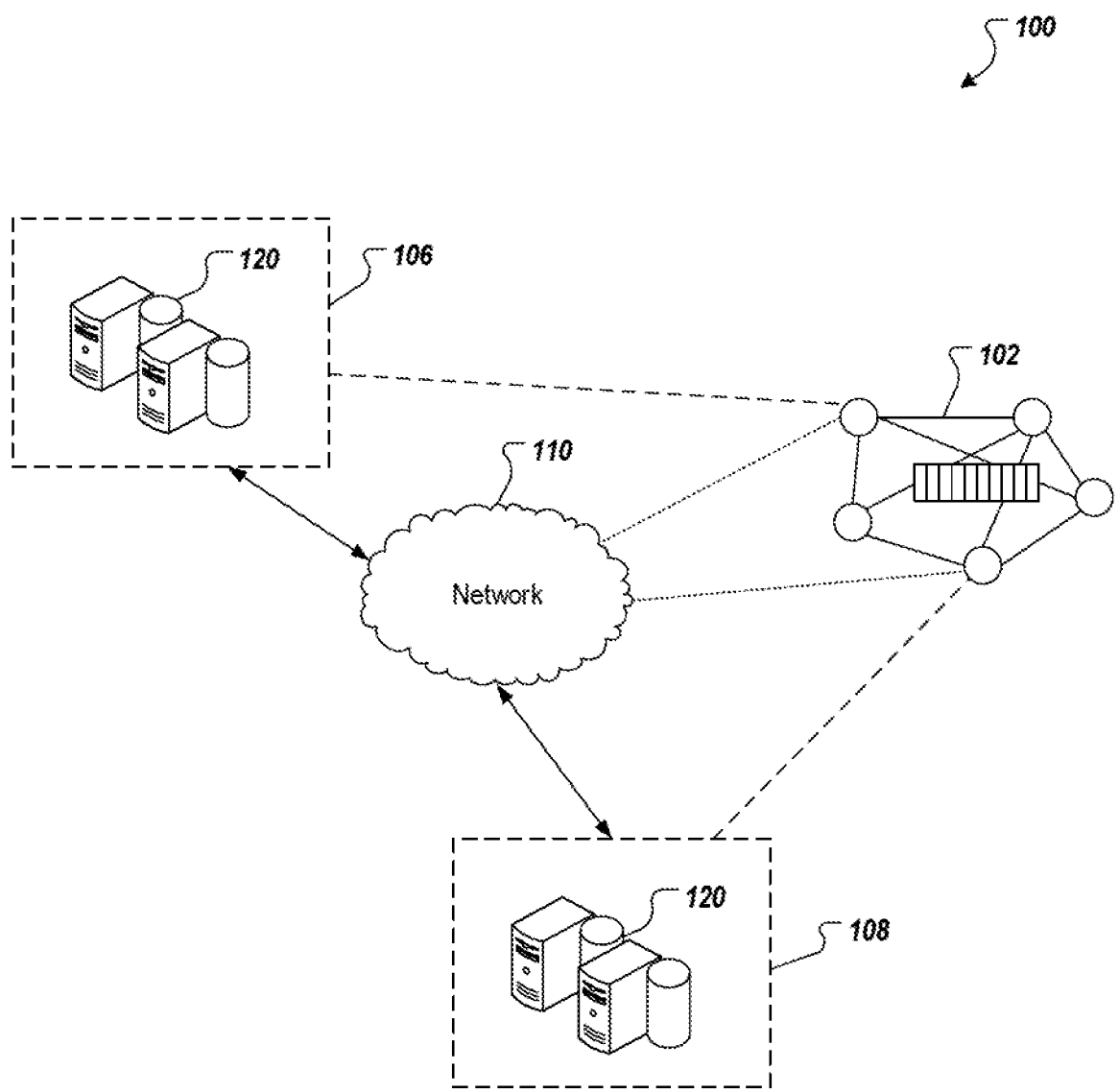
FIG. 1 depicts an example of an environment that can be used to execute implementations of the specification.

Implementations of the specification include computer-implemented methods for improving blockchain network transactions. More particularly, implementations of the specification are directed to accelerating transaction deliveries in blockchain networks using transaction resending.

In some implementations, actions include receiving, in a blockchain transaction acceleration system, a first transaction sent through a first node in a blockchain; receiving, in the blockchain transaction acceleration system, at least one second transaction that is a duplicate of the first transaction, the at least one second transaction sent by the first node to at least one second node in the blockchain is different from the first node; executing, by the blockchain transaction acceleration system, a first-received transaction among received transactions that include the first transaction and the at least one second transaction; and upon determining, by the blockchain transaction acceleration system, that remaining transactions of the received transactions are identical to the first-received transaction, discarding the remaining transactions.

To provide further context for implementations of the specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with currency networks, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. Example public blockchain networks include particular peer-to-peer payment networks that leverage a distributed ledger, referred to as blockchain. As noted above, the term blockchain, however, is used to generally refer to distributed ledgers without particular reference to any particular blockchain network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. Example consensus protocols include, without limitation, proof-ofwork (POW) (e.g., implemented in the some currency networks), proof-of-stake (POS), and proof-of-authority (POA). POW is referenced further herein as a non-limiting example.

In general, a private blockchain network private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the specification are described in further detail herein with reference to a public blockchain network, which is public among the participating entities. It is contemplated, however, that implementations of the specification can be realized in any appropriate type of blockchain network.

Implementations of the specification are described in further detail herein in view of the above context. More particularly, and as introduced above, implementations of the specification are to accelerating transaction deliveries in blockchain networks using transaction resending. In a first example (described with reference to FIGS. 3A-4), transactions can be repeated to reduce the speed of transaction arrival, as some transaction routes can be faster, which can improve the overall execution efficiency of the transaction. In a second example (described with reference to FIGS. 5-6), network acceleration nodes can be used in the blockchain network to accelerate the node forwarding transaction, which can improve the transaction propagation rate. In a third example (described with reference to FIGS. 7-8), a public node acceleration network can be established that can provide unified network acceleration services for different blockchain systems. The establishment of the public node acceleration network can reduce costs, for example, by avoiding costs associated with implementing a dedicated acceleration network for each blockchain system.

FIG. 1 depicts an example of an environment 100 that can be used to execute implementations of the specification. In some examples, the example environment 100 enables entities to participate in a blockchain network 102. The blockchain network 102 can be a public, private, or consortium blockchain network. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the blockchain network 102. In general the network 110 represents one or more communication networks.

In the depicted example, the computing systems 106, 108 can each include any appropriate computing system that enables participation as a node in the blockchain network 102. Example computing devices include, without limitation, a server, a desktop computer, a laptop computer, a tablet computing device, and a smartphone. In some examples, the computing systems 106, 108 hosts one or more computer-implemented services for interacting with the blockchain network 102. For example, the computing system 106 can host computer-implemented services of a first entity (e.g., Participant A), such as transaction management system that the first entity uses to manage its transactions with one or more other entities (e.g., other participants). The computing system 108 can host computer-implemented services of a second entity (e.g., Participant B), such as transaction management system that the second entity uses to manage its transactions with one or more other entities (e.g., other participants). In the example of FIG. 1, the blockchain network 102 is represented as a peer-to-peer network of nodes, and the computing systems 106, 108 provide nodes of the first entity, and second entity respectively, which participate in the blockchain network 102.

Figure 2:
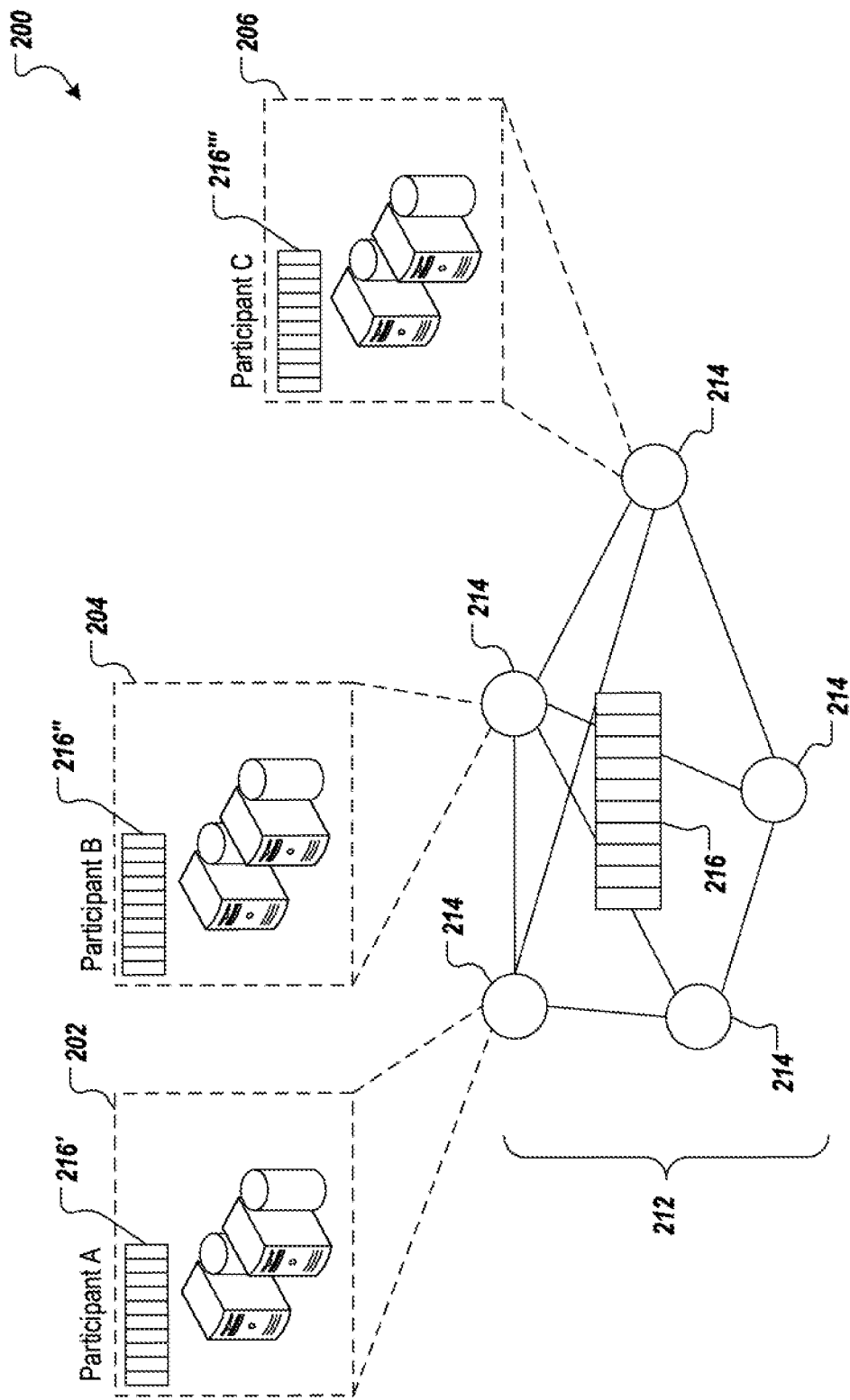
FIG. 2 depicts an example of a conceptual architecture in accordance with implementations of the specification.

FIG. 2 depicts an example of a conceptual architecture 200 in accordance with implementations of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, 206 store respective, complete copies 216', 216", 216'" of the blockchain 216.

A blockchain (e.g., the blockchain 216 of FIG. 2) is made up of a chain of blocks, each block storing data. Example data includes transaction data representative of a transaction between two or more participants. While transactions are used herein by way of non-limiting example, it is contemplated that any appropriate data can be stored in a blockchain (e.g., documents, images, videos, audio). Example transactions can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and compete to have a block added to the blockchain. Such nodes are referred to as miners (or minder nodes). POW, introduced above, is used as a non-limiting example.

The miner nodes execute the consensus process to add transactions to the blockchain. Although multiple miner nodes participate in the consensus process, only one miner node can write the block to the blockchain. That is, the miner nodes compete in the consensus process to have their block added to the blockchain. In further detail, a miner node periodically collects pending transactions from a transaction pool (e.g., up to a predefined limit on the number of transactions that can be included in a block, if any). The transaction pool includes transaction messages from participants in the blockchain network. The miner node constructs a block, and adds the transactions to the block. Before adding the transactions to the block, the miner node checks whether any of the transactions are already included in a block of the blockchain. If a transaction is already included in another block, the transaction is discarded.

The miner node generates a block header, hashes all of the transactions in the block, and combines the hash value in pairs to generate further hash values until a single hash value is provided for all transactions in the block (the Merkle root hash). This hash is added to the block header. The miner also determines the hash value of the most recent block in the blockchain (i.e., the last block added to the blockchain). The miner node also adds a nonce value, and a timestamp to the block header. In a mining process, the miner node attempts to find a hash value that meets required parameters. The miner node keeps changing the nonce value until finding a hash value that meets the required parameters.

Every miner in the blockchain network attempts to find a hash value that meets the required parameters, and, in this way, compete with one another. Eventually, one of the miner nodes finds a hash value that meets the required parameters, and advertises this to all other miner nodes in the blockchain network. The other miner nodes verify the hash value, and if determined to be correct, verifies each transaction in the block, accepts the block, and appends the block to their copy of the blockchain. In this manner, a global state of the blockchain is consistent across all miner nodes within the blockchain network. The above-described process is the POW consensus protocol.

A non-limiting example is provided with reference to FIG. 2. In this example, Participant A wants to send an amount of currency to Participant B. Participant A generates a transaction message (e.g., including From, To, and Value fields), and sends the transaction message to the blockchain network, which adds the transaction message to a transaction pool. Each miner node in the blockchain network creates a block, and takes all transactions from the transaction pool (e.g., up to a predefined limit on the number of transaction that can be added to a block, if any), and adds the transactions to the block. In this manner the transaction published by Participant A is added to the blocks of the miner nodes.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some implementations, faster communication between nodes in a blockchain can be realized if, for example, Node_A transmits multiple copies of a same transaction. For example, in addition to Node_A sending a transaction to Node_B (for example, the destination node), Node_A can also send a duplicate of the transaction to at least one other node. A third node, for example, may be able to provide (or result in) faster network transmissions. Faster network transmissions can occur, for example, if the third node is able to initiate an eventual completion of delivery of the transmission to the network Node_B before the transmission that comes directly from Node_A. Generally, a transaction sent to the third node can be delivered to Node_B, but additional intermediate nodes are possible. The duplication of transactions in this way can make use of replay and forwarding features of blockchain networks. The duplication of transactions can also help to prevent repeated attacks (for example, malware or unauthorized access) on blockchain networks by propagating duplicates of the same transaction. As a result of these features of blockchain networks, the transaction can be delivered to the destination node as fast as possible. A resulting benefit of faster delivery of the transaction is a faster execution of the transaction at the destination node.

Figure 3A:
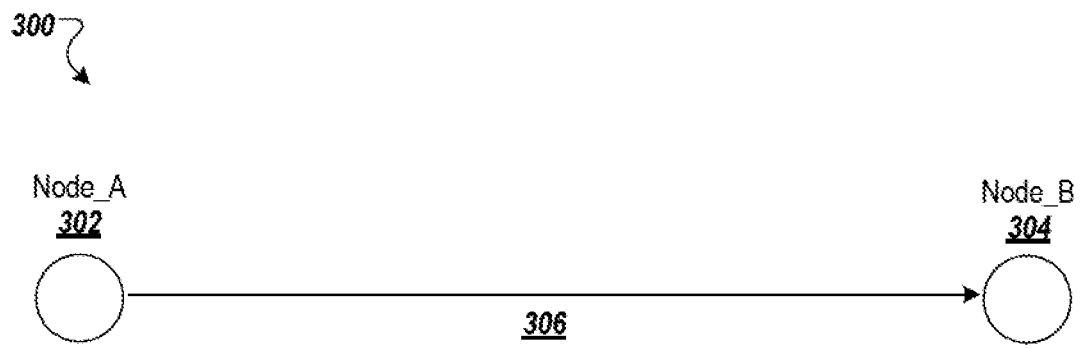
FIG. 3A is a block diagram showing an example of a path for a transaction sent directly between two nodes in a blockchain in accordance with implementations of the specification.

FIG. 3A is a block diagram showing an example of a path 300 for a transaction sent (or delivered) directly between two nodes in a blockchain. For example, the path 300 can be used for a transaction that is sent by Node_A 302 to Node_B 304 for execution by Node_B 304. In some cases, the transaction can be sent using a direct communication 306 between Node_A 302 and Node_B 304. As such, FIG. 3A can represent a conventional technique for sending a transaction from one node to another node in a blockchain. However, due to uncertainties in the network used by the blockchain, connectivity between nodes in the blockchain can have disadvantages. For example, if the nodes are not on the same network, or if the blockchain nodes are deployed in different countries, a direct connection of the network (for example, direct communication 306) may not be the fastest possible path of the transaction.

Figure 3B:
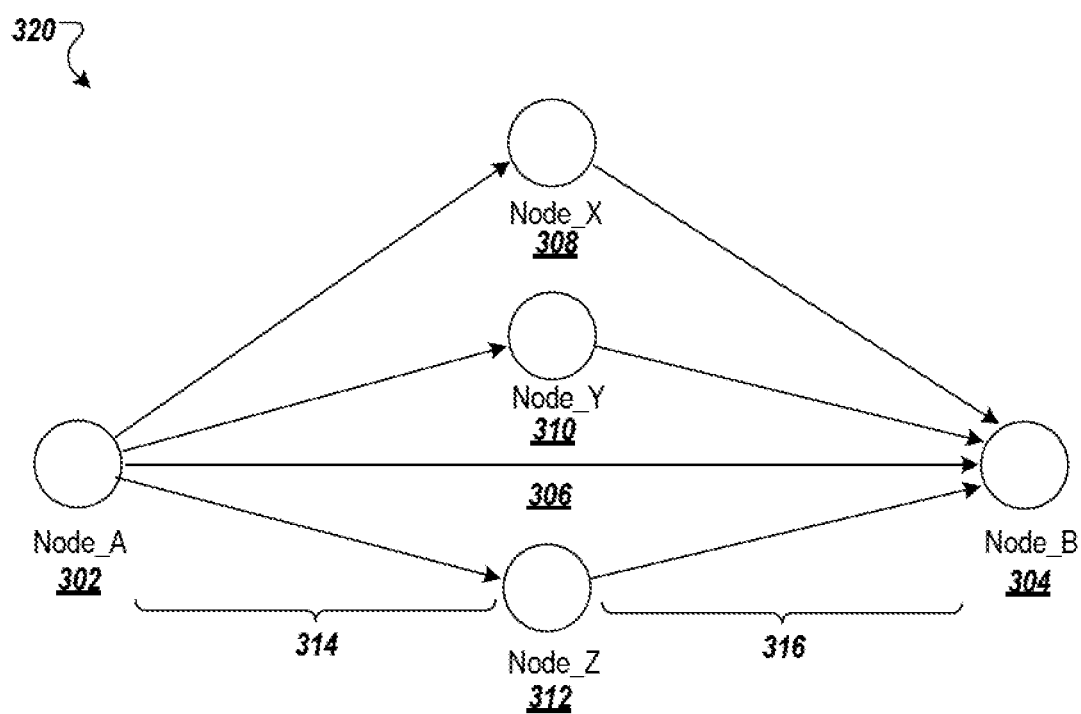
FIG. 3B is a block diagram showing an example of paths used in sending multiple forwarded transactions in a blockchain transaction acceleration system in accordance with implementations of the specification.

FIG. 3B is a block diagram showing an example of paths used in sending multiple forwarded transactions in a blockchain transaction acceleration system 320. The blockchain transaction acceleration system 320 can be implemented, for example, using components described with reference to other figures in this specification (such as, FIGS. 1-2).

The blockchain transaction acceleration system 320 can provide an improvement over systems that use single communication paths (for example, without multiple transaction forwarding and described with reference to FIG. 3A). For example and as shown in FIG. 3B, a direct communication 306 between Node_A 302 and Node_B 304 can still be used for the transaction. However, in addition to using the direct communication 306, the transaction can be duplicated and sent to additional nodes 308-312. For example, in order to accelerate delivery of the transaction to the Node_B 304, the Node_A 302 can also send the transaction to Node_X 308, Node_Y 310, and Node_Z 312 over communication paths 314. The transactions can then be forwarded by Node_X 308, Node_Y 310, and Node_Z 312 over communication paths 316. When Node_A 302 sends multiple copies (in the current example, a total of four transaction instances) of the same transaction in this way, Node_A 302 does not know which transaction will be the first transaction to reach Node_B 304. The transaction arrival order does not matter, as Node_B 304 can be configured to disregard duplicate transactions after processing the first transaction that is received.

Node_B 304, serving as the receiver node (and the destination node of the transaction in the current example) may receive multiple identical transactions. Only the first transaction will be executed. Other transactions that are determined to be duplicate transactions can be automatically identified as invalid transactions by the blockchain system. As such, the duplicate transactions will not be executed.

Duplicate transactions can be determined in various ways. For example, transactions can be determined to be duplicate transactions if the transactions have the same digital signature. When a transaction is received, for example, a digital signature of the transaction can be compared to a recently-executed (or first-arriving) transaction. Other ways of determining duplicate transactions can also be used (for example, using common blockchain technology).

Over time, statistics can be collected and maintained in order to record and track transmission speeds that occur on a per node basis. For example, many nodes may route transactions through by Node_X 308, Node_Y 310, and Node_Z 312. If Node_Y 310 is determined to be faster over time than Node_X 308 and Node_Z 312, for example, then Node_Y 310 can become a preferred node. In some implementations, lists of preferred nodes can be maintained, and when a transaction is sent through multiple nodes, the fastest node(s) can be selected first. Over time, slower nodes can be avoided by the blockchain system.

In some implementations, the nodes that are selected can be chosen based on various factors in addition to speed. For example, some nodes may be faster at different times of day or days of the week. In another example, some nodes can be avoided based on their geographic location, which, in addition to tracked transmission speed, can be an indicator of a predicted transmission speed for a given transaction.

In some implementations, different techniques can be used to decide how many duplicate transactions are to be sent and which nodes are to be used for sending the duplicate transactions. For example, the blockchain system can send a separate duplicate transaction to each hub accessible to the sending node. Each hub, for example, can correspond to a different service provider. Over time, the blockchain system can build a database that identifies the best and fastest providers. In some implementations, service providers can be assigned a score, with a highest score being assigned to the service provider having a history of being the fastest service provider in routing duplicate transactions. In some implementations, transactions can be spread over several higher-scoring service providers so as not to saturate a single service provider with too much traffic.

Figure 4:
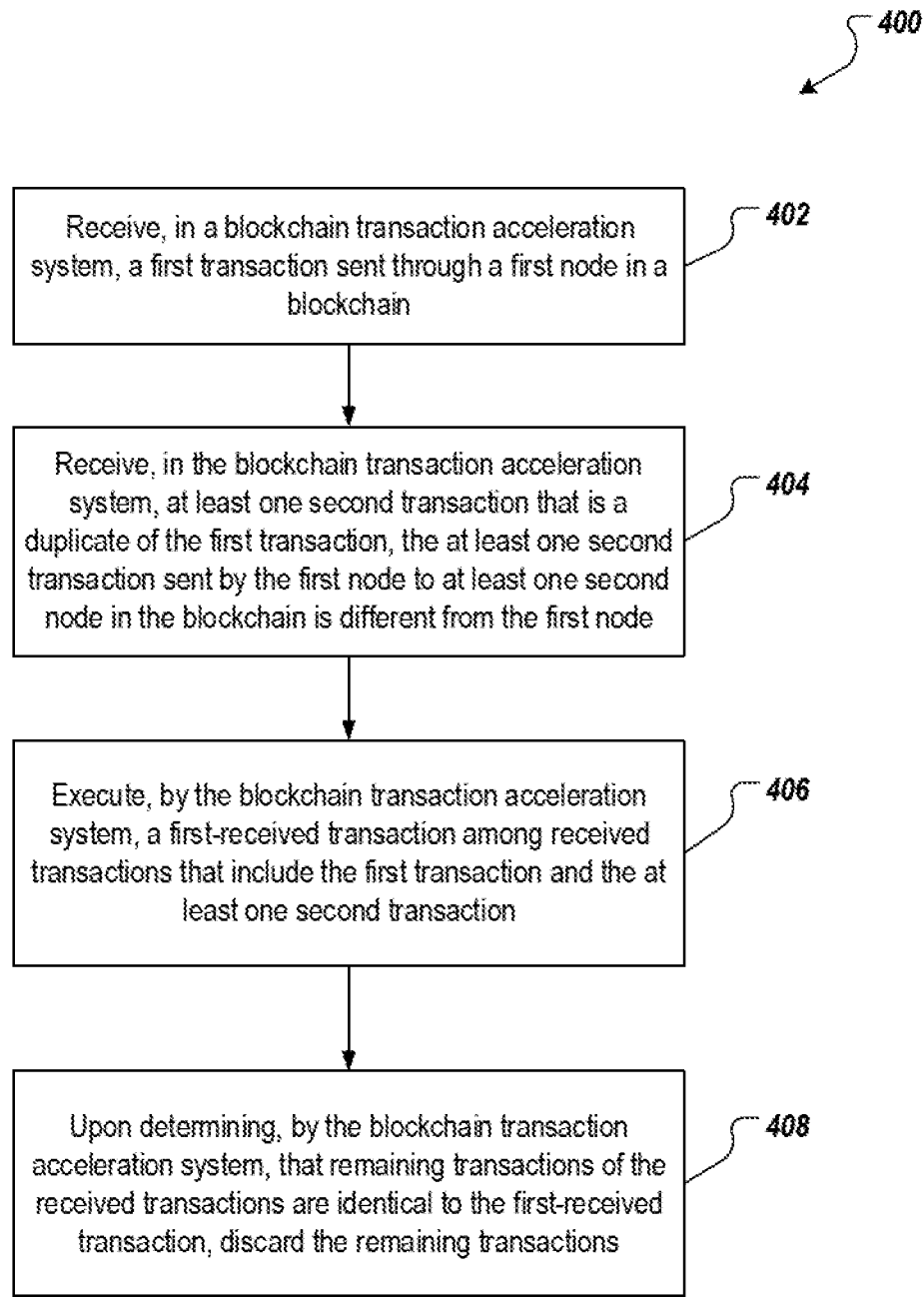
FIG. 4 depicts an example process for using duplicate transactions in a blockchain network in accordance with implementations of the specification.

FIG. 4 depicts an example process 400 for using duplicate transactions in a blockchain network. The process 400 can be executed in accordance with implementations of the specification. In some implementations, the example process 400 may be performed using one or more computer-executable programs executed using one or more computing devices.

The process 400 can be part of (and implemented within) a blockchain transaction acceleration system that is implemented in one or more nodes in the blockchain or in a server accessible by the blockchain. For example, the blockchain transaction acceleration system 320 described with reference to FIG. 3B can implement the process 400.

At 402, a first transaction sent through a first node in a blockchain is received in a blockchain transaction acceleration system. As an example, within the blockchain transaction acceleration system 320, the direct communication 306 can be used to send a transaction between Node_A 302 and Node_B 304. From 402, method 400 proceeds to 404.

At 404, at least one second transaction that is a duplicate of the first transaction is received in the blockchain transaction acceleration system, where the at least one second transaction is sent by the first node to at least one second node in the blockchain that is different from the first node. As an example, the blockchain transaction acceleration system 320 can send a duplicate of the transaction (already sent to Node_B 304) to one or more of the additional nodes 308-312. The duplicate of the transaction can be sent using communication paths 314.

In some implementations, the first node in the blockchain and the at least one second node in the blockchain can be within different network hubs provided by different network service providers. For example, Node_A 302 and Node_B 304 can be in separate and different network hubs, such as in different regions or countries, or using different network service providers.

In some implementations, method 400 can further include determining a plurality of second nodes to use for sending the at least one second transaction. For example, the blockchain transaction acceleration system 320 can select specific ones of the additional nodes 308-312 to which the duplicate of the transaction is sent. From 404, method 400 proceeds to 406.

At 406, a first-received transaction among received transactions that include the first transaction and the at least one second transaction is executed by the blockchain transaction acceleration system. For example, Node_B 304 can execute the first transaction that arrives over the communication path 306 and the communication path 316. The transaction that arrives first can depend on which communication path is fastest. From 406, method 400 proceeds to 408.

At 408, upon determining, by the blockchain transaction acceleration system, that remaining transactions of the received transactions are identical to the first-received transaction, the remaining transactions are discarded. For example, Node_B 304 can receive one or more duplicates of the first-received transaction. Node_B 304 can determine that the remaining (non-first-received) transactions are duplicate transactions. Node_B 304 can then discard the duplicate transactions.

In some implementations, determining that the remaining transactions of the received transactions are identical to the first-received transaction includes identifying a digital signature of each of the remaining transactions that matches a digital signature of the first-received transaction. For example, Node_B 304 can determine that the remaining (non-first-received) transactions are duplicate transactions by comparing digital signatures of the transactions and determining that matching digital signatures exist. After 408, method 400 can stop.

In some implementations, method 400 can further include collecting transmission speed statistics on the received transactions to determine nodes in the blockchain that provide faster transaction transmission speeds. For example, over time, the blockchain transaction acceleration system 320 can determine that one or more of the additional nodes 308-312 has provided faster transaction delivery speeds than others. The transaction delivery speed information can be stored and tracked over time by the blockchain transaction acceleration system 320.

In some implementations, method 400 can further include determining, for a given transmission-sending node and based on the transmission speed statistics, a set of preferred nodes to which transactions are to be sent. For example, the blockchain transaction acceleration system 320 can use the statistics identifying fastest transaction delivery nodes in selecting which of the additional nodes 308-312 to use for sending duplicate transactions.

In some cases, direct connections between blockchain network nodes may not always be the fastest transaction paths between the blockchain network nodes. For example, node A may be located in one country and node B may be located in a different country. The locations of the nodes, by being located in different countries (or other areas), can create or contribute to network instability. A transaction that is sent from Node_A to Node_B can involve complex factors, including, for example, factors associated with different network providers. As a result, a direct connection between Node_A and Node_B can be slow or unstable. The speed and reliability of a transaction delivery can be affected, for example, by large amounts of traffic that are handled by the network providers. If a large amount of data is transmitted that uses a same network as direct connection between Node_A and Node_B, for example, then transaction execution efficiency of the blockchain network can be detrimentally affected. As previously described with reference to FIGS. 3A-4, some issues with transaction execution efficiency can be improved by sending multiple transactions. In some implementations, transaction execution efficiency can be improved by using network acceleration nodes in a blockchain.

Figure 5:
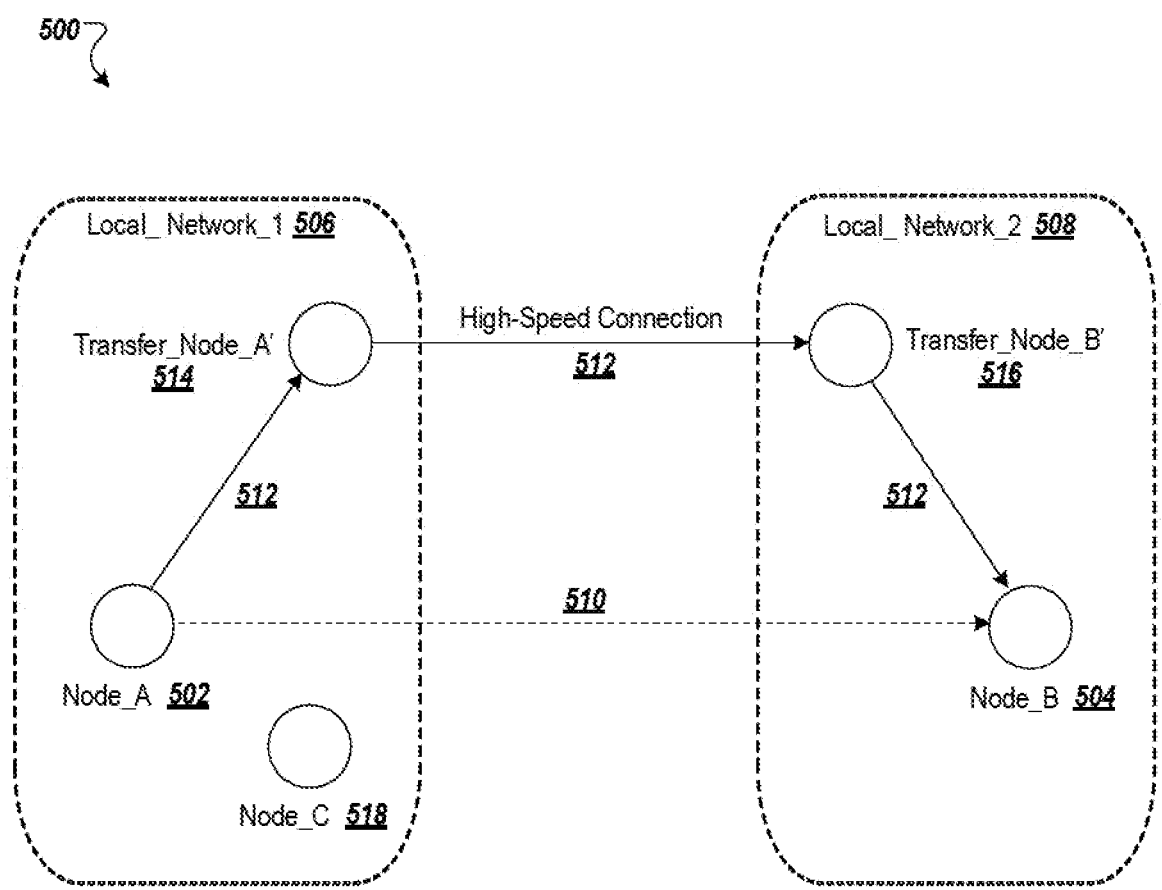
FIG. 5 is a block diagram showing an example of paths used in a blockchain transaction acceleration system for a transaction sent using network acceleration nodes in a blockchain in accordance with implementations of the specification.

FIG. 5 is a block diagram showing an example of paths used in a blockchain transaction acceleration system 500 for a transaction sent using network acceleration nodes in a blockchain. As shown by arrows in the paths, Node_A 502 is the sender of the transaction, and Node_B 504 is the intended recipient of the transaction. Node_A 502 and Node_B 504 can be in different network areas, for example, such as Local_Network_1 506 and Local_Network_2 508, respectively. Node_A 502 and Node_B 504 can be capable of communicating directly, for example, using a communication channel 510 that is part of the blockchain network. However, a faster transmission of the transaction may be possible and can occur using a communication path 512 that provides a high-speed communication. As a result, a transmission of a transaction from Node_A 502 to Node_B 504 can use forwarding nodes that include at least Transfer_Node_A' 514 and Transfer_Node_B' 516. In some implementations, Transfer_Node_A' 514 can forward the transaction directly to Node_B 504 without forwarding the transaction through Transfer_Node_B' 516.

Transfer nodes can serve multiple nodes in a network area. For example, one or more regular nodes, such as Node_A 502 and Node_C 518, can be assigned to Transfer_Node_A' 514. Each regular node can have access to multiple transfer nodes in a same network area or different network areas. However, in the current example, nodes A/A' and nodes BB' can each belong to their own network area. In this case, transmission speeds can be faster based on the use of the transfer nodes, providing a high-speed network communication between A' and B'.

The use of acceleration nodes can accelerate the network transmission rate of transaction by effectively creating a high-speed link between network acceleration nodes. The high-speed link between network acceleration nodes can improve the overall transaction execution efficiency of the blockchain system.

Acceleration nodes can be designed, for example, to have no (or substantially no) involvement with the content or handling of the transaction. As such, groups of acceleration nodes can serve as a transfer network, which can be especially useful in international blockchain networks. In some implementations, acceleration nodes can be provided as a service, such as a third-party acceleration network that is offered to public entities. Any given transaction that is sent and that uses the transfer network of acceleration nodes can use pieces of the network. For example, the given transaction may use only a few acceleration nodes, including the acceleration nodes that provide the shortest or fastest path for delivery of the given transaction.

In some implementations, shortest path algorithms can be used to choose acceleration nodes that are to be used for the given transaction. The shortest path algorithms can use information about each acceleration node and its statistics associated with sending transactions, including transmission speeds. Some of the information used by the shortest path algorithms can include, or be based on, time-of-day information and geography information. For example, acceleration nodes in Country C may be faster during nighttime hours when daytime traffic in a blockchain network is not present.

Figure 6:
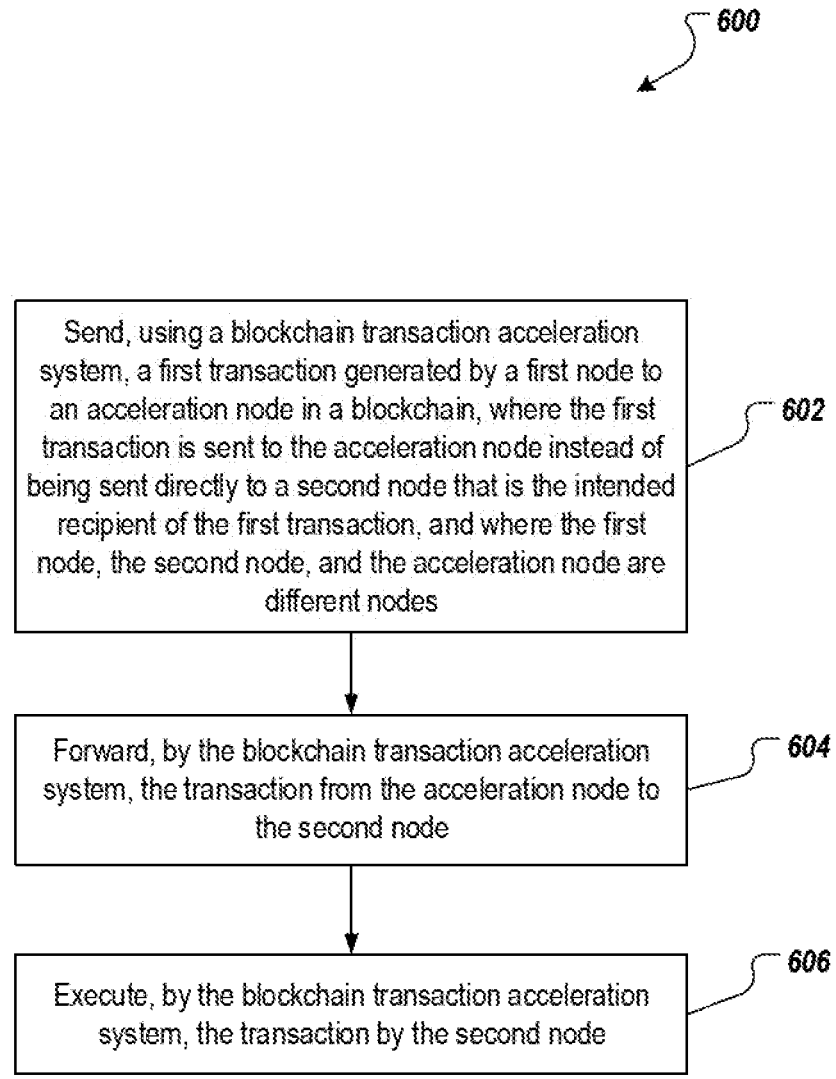
FIG. 6 depicts an example of a process for using acceleration nodes for sending transactions in a blockchain network in accordance with implementations of the specification.

FIG. 6 depicts an example of a process 600 for using acceleration nodes for sending transactions in a blockchain network. The process 600 can be executed in accordance with implementations of the specification. In some implementations, the example process 600 may be performed using one or more computer-executable programs executed using one or more computing devices.

The process 600 can be part of (and implemented within) a blockchain transaction acceleration system that is implemented in one or more nodes in the blockchain or in a server accessible by the blockchain. For example, the blockchain transaction acceleration system 500 described with reference to FIG. 5 can implement the process 600.

At 602, a first transaction generated by a first node is sent, using a blockchain transaction acceleration system, to an acceleration node in a blockchain, where the first transaction is sent to the acceleration node instead of being sent directly to a second node that is the intended recipient of the first transaction, and where the first node, the second node, and the acceleration node are different nodes. For example, using the blockchain transaction acceleration system 500, a transaction can be sent from Node_A 502 to Transfer_Node_A' 514, which is an acceleration node. The blockchain transaction acceleration system 500 can select Transfer_Node_A' 514, for example, instead of sending the transaction directly to Node_B 504. A selection decision can be based, for example, on knowledge that communication channel 512 is (or is likely to be) faster than communication channel 510.

In some implementations, the first node in the blockchain and the second node in the blockchain are in different networks. For example, Node_A 502 and Node_B 504 can be in Local_Network_1 506 and Local_Network_2 508, respectively, which are different network areas.

In some implementations, the acceleration node can be configured to forward transactions to one or more specific acceleration nodes in the different networks. As an example, Transfer_Node_A' 514 can be configured in the blockchain transaction acceleration system 500 as a designated acceleration node.

In some implementations, method 600 can further include selecting the acceleration node based on determining that a transaction delivery time using the acceleration node is expected to be faster than a transaction delivery time that is expected by sending the transaction directly to the second node. For example, the blockchain transaction acceleration system 500 can select Transfer_Node_A' 514 based on knowledge that using Transfer_Node_A' 514 as an acceleration node is (or is likely to be) faster than sending the transaction directly to Node_B 504. From 602, method 600 proceeds to 604.

At 604, the transaction is forwarded, by the blockchain transaction acceleration system, from the acceleration node to the second node. For example, Transfer_Node_A' 514 can forward the transaction over communication path 512 to Node_B 504.

In some implementations, forwarding the transaction from the acceleration node to the second node can include the use of a recipient-side acceleration node. For example, Transfer_Node_A' 514 can forward the transaction over communication path 512 to a recipient-side acceleration node such as Transfer_Node_B' 516 that is an acceleration node in Local_Network_2 508. The recipient-side acceleration node (for example, Transfer_Node_B' 516) can forward the transaction to the second node (for example, Node_B 504). From 604, method 600 proceeds to 606.

At 606, the transaction is executed by the second node. As an example, Node_B 504 can execute the received transaction. After 606, method 600 can stop.

In some implementations, method 600 can further include the use of transaction delivery time statistics and selection of acceleration nodes based on the transaction delivery time statistics. For example, the blockchain transaction acceleration system 500 can collect statistics on delivered transactions (for example, using communication channel 512) to determine acceleration nodes in the blockchain that provide faster transaction delivery times. Then, the blockchain transaction acceleration system 500 can select an acceleration node having a faster transaction delivery time, for example, Transfer_Node_A' 514.

In some implementations, transactions can be sent using a combination of previously-described techniques, including sending multiple copies of the same transaction and using acceleration nodes. For example, a sending node can send a copy of a transaction to the intended recipient node. In order to reduce the delivery time of the transaction, the sending node can also send a copy of the transaction to one or more other nodes, including normal (non-acceleration nodes) and acceleration nodes. In some implementations, a network of acceleration nodes that is provided can also be used to improve transmission times of transactions.

Figure 7:
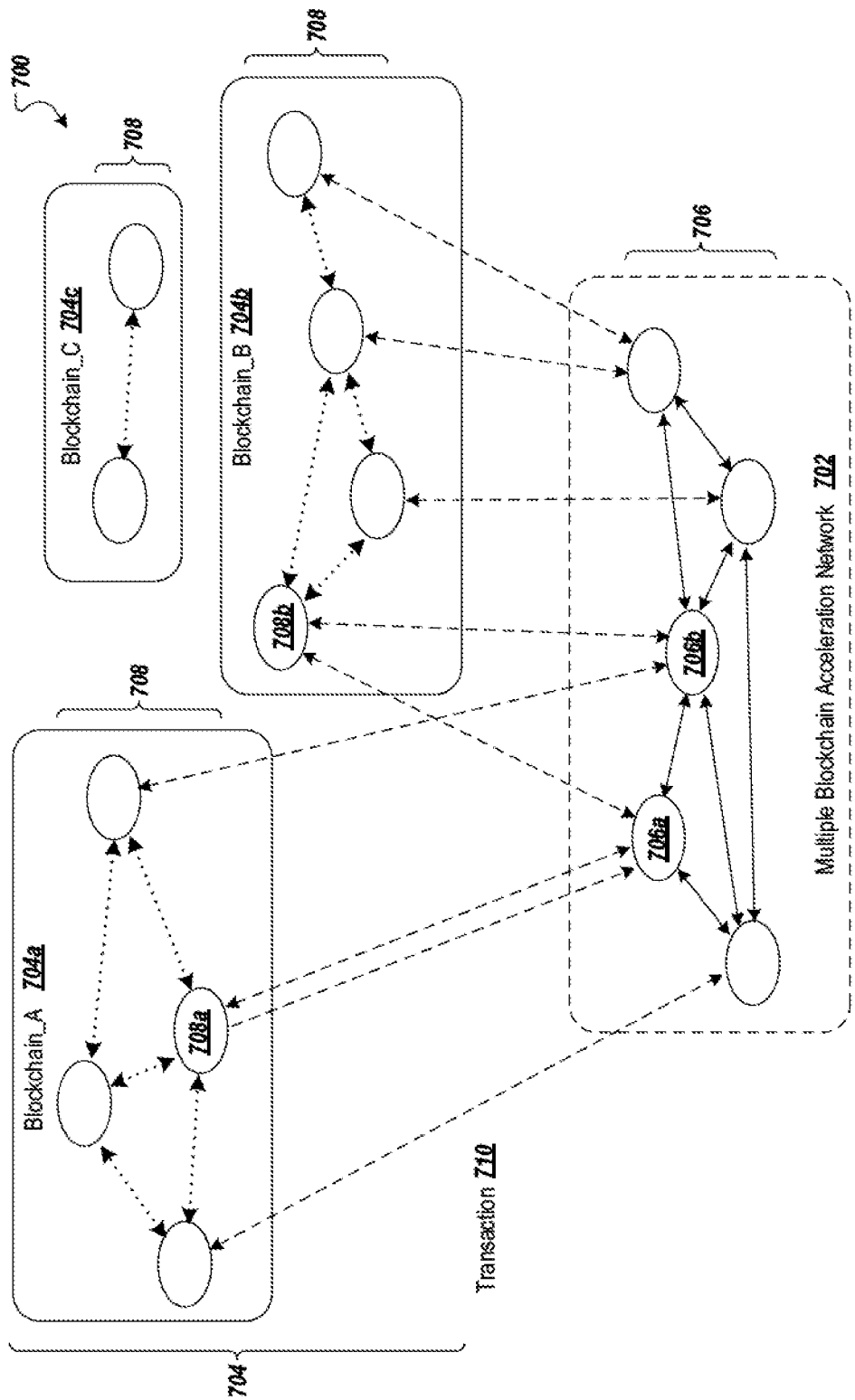
FIG. 7 is a block diagram of an example of a multiple blockchain acceleration network of a blockchain transaction acceleration system in accordance with implementations of the specification.

FIG. 7 is a block diagram of an example of a multiple blockchain acceleration network 702 of a blockchain transaction acceleration system 700. For example, the multiple blockchain acceleration network 702 can serve as a public node acceleration network that provides unified network acceleration services for different blockchain systems that include blockchains 704. The multiple blockchain acceleration network 702 can reduce or eliminate the costs of establishing a dedicated acceleration network for each blockchain system.

Nodes 708 in a given blockchain of blockchains 704 can communicate with acceleration nodes 706 in the multiple blockchain acceleration network 702. Due to the uncertainty of the network, the use of an acceleration node 706, serving as the transit node in the acceleration network, may be more efficient than the direct communication between the nodes.

Therefore, the blockchain system can rely on a high-speed network of information forwarding that is provided by the multiple blockchain acceleration network 702.

For different blockchain systems, the requirements for communication between nodes can be the same, so multiple blockchain systems can reuse the same multiple blockchain acceleration network 702. This can improve the reusability of the multiple blockchain acceleration network 702 and reduce or eliminate construction costs for networks in blockchain systems. The savings can occur because blockchain systems can have a large number of communication requirements. Due to network uncertainties, direct communication efficiency between nodes may be lower than indirect communication using network acceleration nodes.

Figure 8:
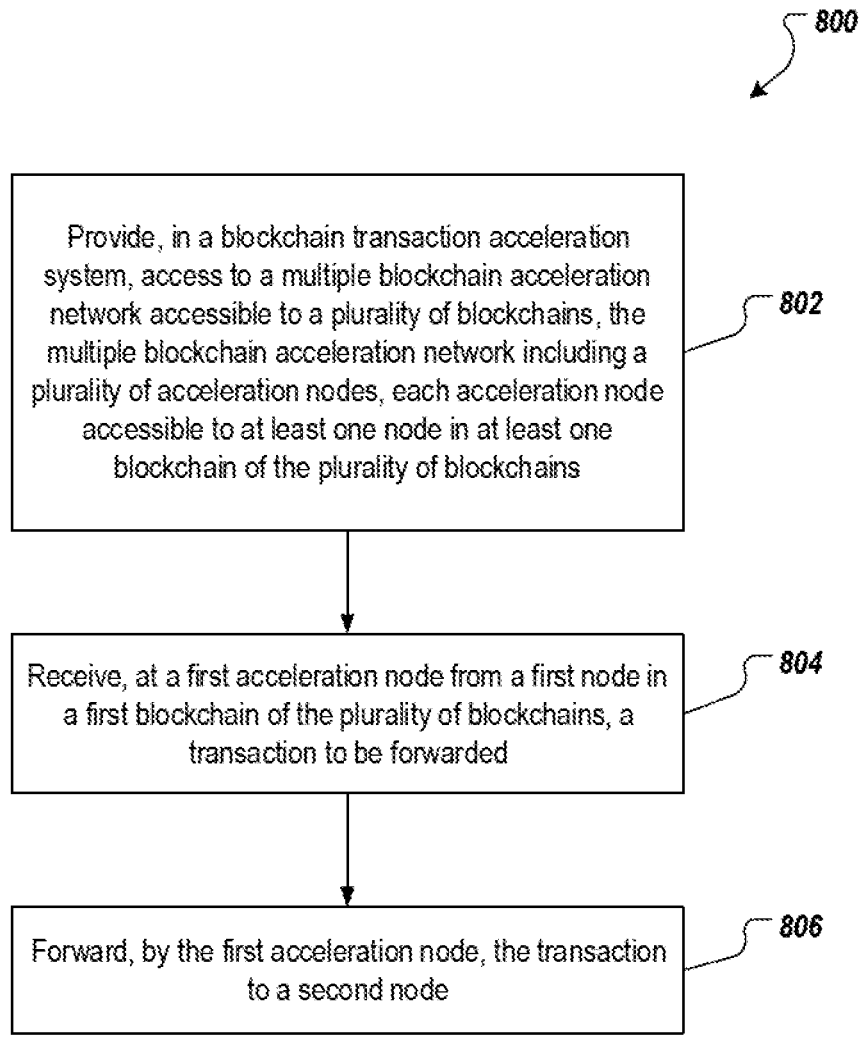
FIG. 8 depicts an example of a process for using a multiple blockchain acceleration network in accordance with implementations of the specification.

FIG. 8 depicts an example of a process 800 for using a multiple blockchain acceleration network. The process 800 can be executed in accordance with implementations of the specification. In some implementations, the example process 800 may be performed using one or more computer-executable programs executed using one or more computing devices.

The process 800 can be part of (and implemented within) a blockchain transaction acceleration system that is implemented in one or more nodes in the blockchain or in a server accessible by the blockchain. For example, the blockchain transaction acceleration system 700 described with reference to FIG. 7 can implement the process 800.

At 802, access is provided, in a blockchain transaction acceleration system, to a multiple blockchain acceleration network accessible to a plurality of blockchains. The blockchains can include, for example, the first blockchain 704*a* and the second blockchain 704*b*. The multiple blockchain acceleration network includes a plurality of acceleration nodes. Each acceleration node is accessible to at least one node in at least one blockchain of the plurality of blockchains. For example, in a blockchain transaction acceleration system 700, access is provided to a multiple blockchain acceleration network 702 accessible to the blockchains 704. The multiple blockchain acceleration network 702 includes the acceleration nodes 706, each being accessible to at least one node 708 in the blockchains 704. From 802, method 800 proceeds to 804.

At 804, a transaction to be forwarded is received at a first acceleration node from a first node in a first blockchain of the plurality of blockchains. As an example, a transaction 710 that is to be forwarded is received at the first acceleration node 706*a* from the first node 708*a* in the first blockchain 704*a*. From 804, method 800 proceeds to 806.

At 806, a transaction to be forwarded is forwarded by the first acceleration node to a second node. For example, the transaction 710 can be forwarded by the first acceleration node 706*a* to a second node. The second node can be, for example, the node 708*b* in the second blockchain 704*b*. In another example, the second node can be the second acceleration node 706*b*. The first node 708*a* in the first blockchain 704*a* and the second node 708*b* in the second blockchain 704*b* can be in different networks. After 806, method 800 can stop.

In some implementations, method 800 can further include the use of statistics on delivered transactions to select acceleration nodes. For example, the blockchain system can collect statistics on delivered transactions that are sent and received by the blockchains 704 and that use the multiple blockchain acceleration network 702. The statistics can be used to determine acceleration nodes 706 in the multiple blockchain acceleration network 702 that provide faster transaction delivery times. After an acceleration node 706 is identified as having a fastest transaction delivery time, for example, the blockchain transaction acceleration system 700 can select the acceleration node 706 for forwarding a transaction.

In some implementations, method 800 can further include steps for allowing blockchains to subscribe to the multiple blockchain acceleration network. For example, a request to subscribe to the multiple blockchain acceleration network 702 can be received from a third blockchain 704*c*. Access to the multiple blockchain acceleration network 702 can then be provided to the third blockchain 704*c*.

In some implementations, parts of methods 400, 600, and 800 can be used in combination. For example, the blockchain transaction acceleration system 420, 500, and 700 can be or serve as one collective blockchain transaction acceleration system that uses a combination of duplicate transactions and acceleration nodes to speed delivery of transactions in blockchains. Decisions of which techniques to use by the collective blockchain transaction acceleration system can be based on real-time information, such as knowledge of network health and traffic, among other factors.

Figure 9:
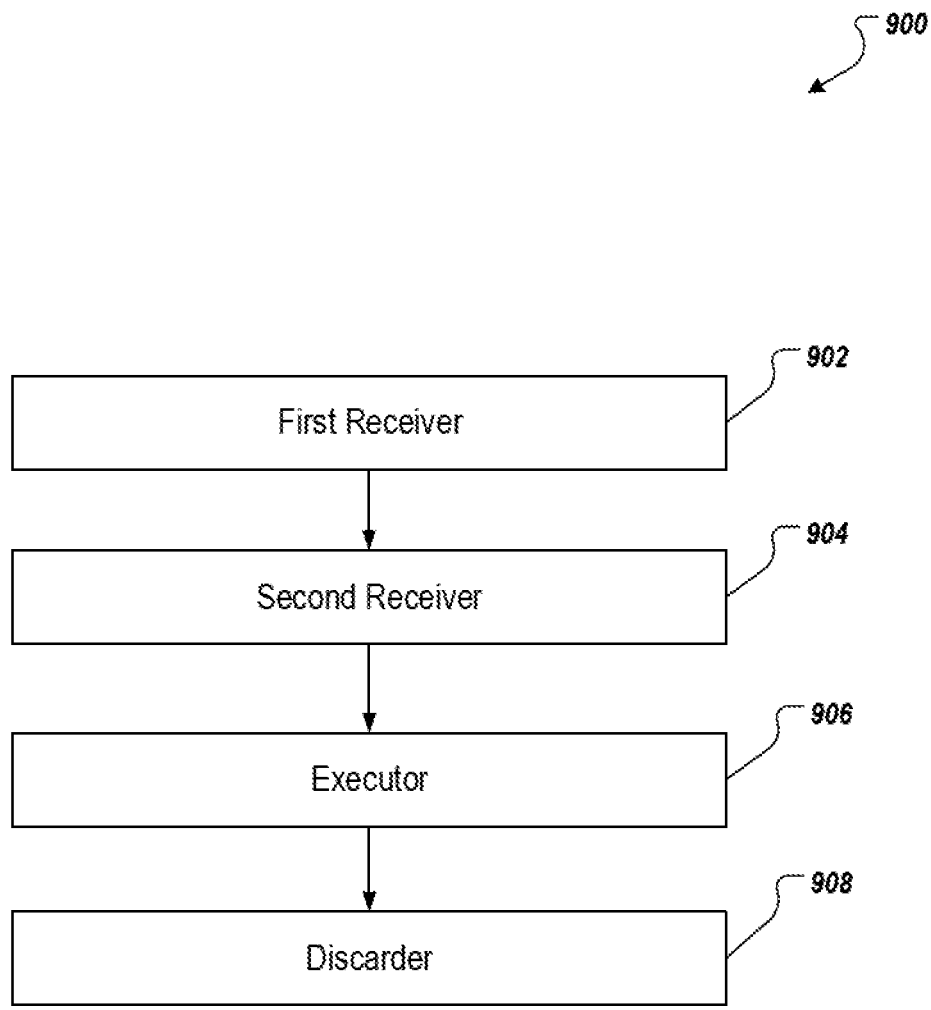
FIG. 9 depicts an example of modules of an apparatus in accordance with implementations of this specification.

FIG. 9 depicts an example of modules of an apparatus 900 in accordance with implementations of this specification. The apparatus 900 can be an example implementation of an apparatus configured to enable accelerating transaction deliveries in blockchain networks using transaction resending (such as, in a consortium or other blockchain-type network). The apparatus 900 can correspond to the implementations described above, and the apparatus 900 includes the following: a first receiver or first receiving unit 902 for receiving, in a blockchain transaction acceleration system, a first transaction sent through a first node in a blockchain; a second receiver or second receiving unit 904 for receiving, in the blockchain transaction acceleration system, at least one second transaction that is a duplicate of the first transaction, the at least one second transaction sent by the first node to at least one second node in the blockchain is different from the first node; an executor or execution unit 906 for executing, by the blockchain transaction acceleration system, a first-received transaction among received transactions that include the first transaction and the at least one second transaction; and a discarder or a discarding unit 908 for, upon determining, by the blockchain transaction acceleration system, that remaining transactions of the received transactions are identical to the first-received transaction, discarding the remaining transactions.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

Referring again to FIG. 9, it can be interpreted as illustrating an internal functional module and a structure of an apparatus to enable accelerating transaction deliveries in blockchain networks using transaction resending. The execution apparatus can be an example of an apparatus configured to enable accelerating transaction deliveries in blockchain networks using transaction resending.

Figure 10:
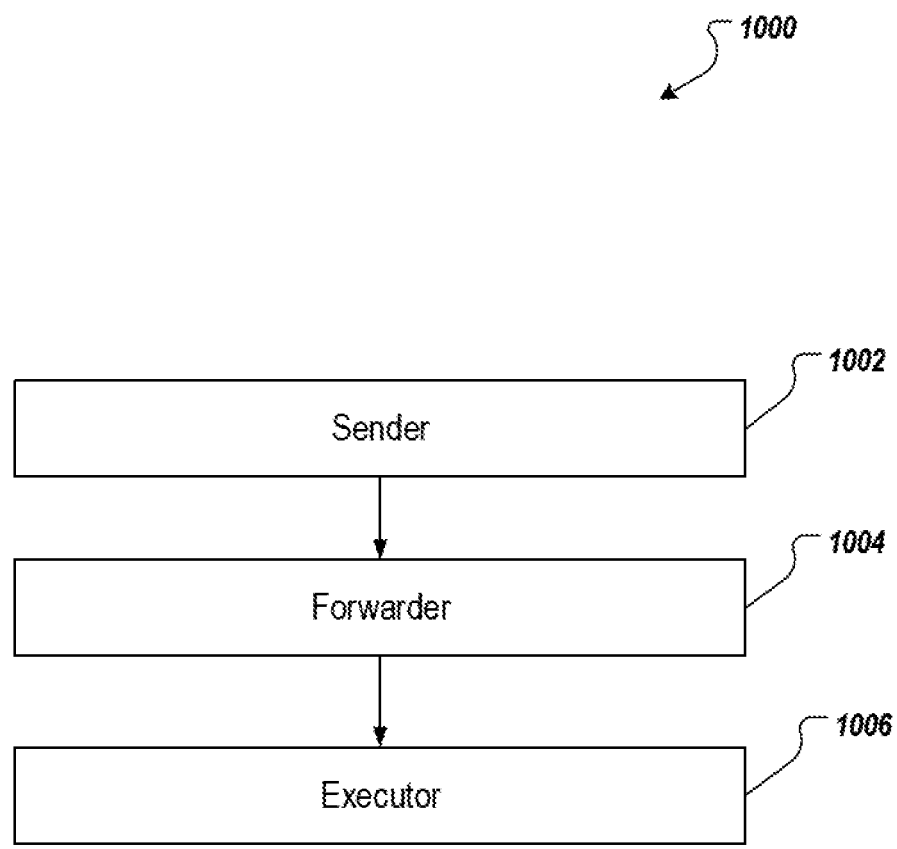
FIG. 10 depicts an example of modules of an apparatus in accordance with implementations of this specification.

FIG. 10 depicts an example of modules of an apparatus 1000 in accordance with implementations of this specification. The apparatus 1000 can be an example implementation of an apparatus configured to enable accelerating the delivery of transactions in blockchain networks using acceleration nodes (such as, in a consortium or other blockchain-type network). The apparatus 1000 can correspond to the implementations described above, and the apparatus 1000 includes the following: a sender or sending unit 1002 for sending, using a blockchain transaction acceleration system, a first transaction generated by a first node to an acceleration node in a blockchain, wherein the first transaction is sent to the acceleration node instead of being sent directly to a second node that is the intended recipient of the first transaction, and wherein the first node, the second node, and the acceleration node are different nodes; a forwarder or a forwarding unit 1004 for forwarding, by the blockchain transaction acceleration system, the transaction from the acceleration node to the second node; and an executor or execution unit 1006 for executing, by the blockchain transaction acceleration system, the transaction by the second node.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

Referring again to FIG. 10, it can be interpreted as illustrating an internal functional module and a structure of an apparatus to enable accelerating the delivery of transactions in blockchain networks using acceleration nodes. The execution apparatus can be an example of an apparatus configured to enable accelerating the delivery of transactions in blockchain networks using acceleration nodes.

Figure 11:
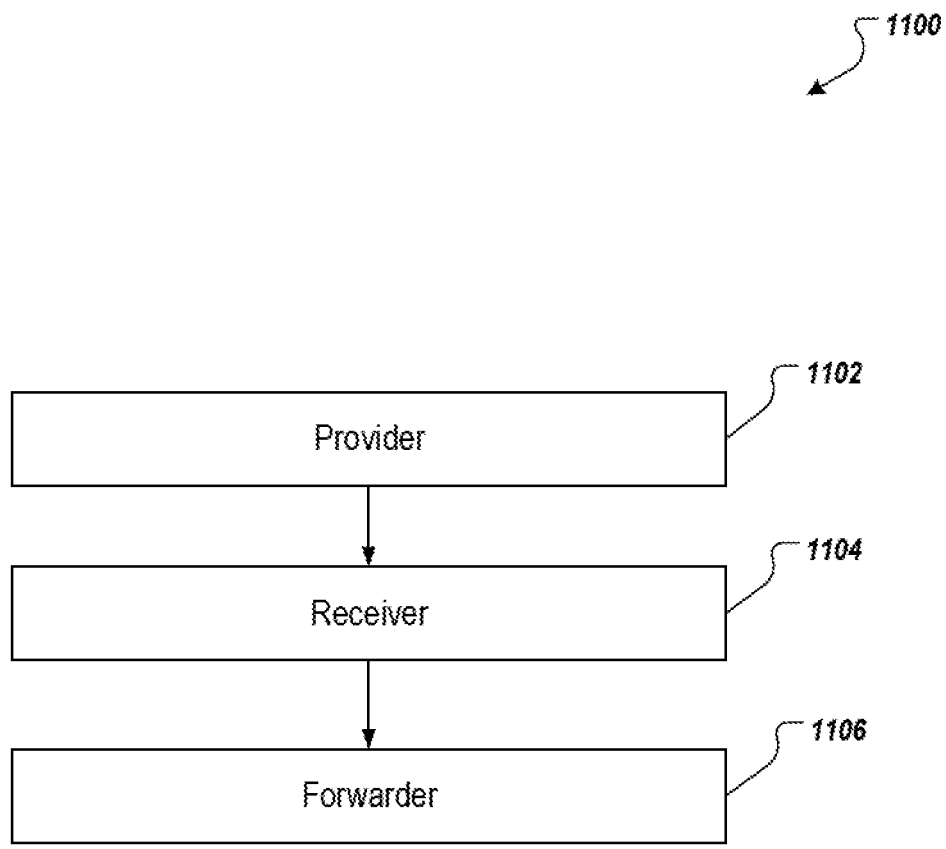
FIG. 11 depicts an example of modules of an apparatus in accordance with implementations of this specification.

FIG. 11 depicts an example of modules of an apparatus 1100 in accordance with implementations of this specification. The apparatus 1100 can be an example implementation of an apparatus configured to improve blockchain transaction speeds using global acceleration nodes (such as, in a consortium or other blockchain-type network). The apparatus 1100 can correspond to the implementations described above, and the apparatus 1100 includes the following: a provider or providing unit 1102 for providing, in a blockchain transaction acceleration system, access to a multiple blockchain acceleration network accessible to a plurality of blockchains, the multiple blockchain acceleration network including a plurality of acceleration nodes, each acceleration node accessible to at least one node in at least one blockchain of the plurality of blockchains; a receiver or a receiver unit 1104 for receiving, at a first acceleration node from a first node in a first blockchain of the plurality of blockchains, a transaction to be forwarded; and a forwarder or forwarding unit 1106 for forwarding, by the first acceleration node, the transaction to a second node.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a number of network units. Some or all of the modules can be selected based on actual demands to achieve the objectives of the solutions of the specification. A person of ordinary skill in the art can understand and implement the implementations of the present application without creative efforts.

Referring again to FIG. 11, it can be interpreted as illustrating an internal functional module and a structure of an apparatus to improve blockchain transaction speeds using global acceleration nodes. The execution apparatus can be an example of an apparatus configured to improve blockchain transaction speeds using global acceleration nodes.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
   receiving, by a second node in a blockchain, a first transaction sent by a first node in the blockchain;
   receiving, by at least one intermediate node in the blockchain, at least one second transaction that is a duplicate of the first transaction, wherein the at least one second transaction is sent by the first node to the at least one intermediate node that is different from the second node;
   transmitting the at least one second transaction from the at least one intermediate node to the second node;
   executing, by the second node, a first-received transaction that is received earliest among received transactions, wherein the received transactions include the first transaction and the at least one second transaction, wherein the first transaction and the at least one second transaction arrive over at least two communication paths, and wherein the first-received transaction arrives over a fastest communication path of the at least two communication paths; and
   upon determining, by the second node, that remaining transactions of the received transactions are identical to the first-received transaction, discarding the remaining transactions of the received transactions, wherein determining that the remaining transactions of the received transactions are identical to the first-received transaction includes identifying a digital signature of each of the remaining transactions of the received transactions that matches a digital signature of the first-received transaction.

2. The computer-implemented method of claim 1, wherein the first node in the blockchain and the second node in the blockchain are within different network hubs provided by different network service providers.

3. The computer-implemented method of claim 1, further comprising collecting transmission speed statistics on the received transactions to determine nodes in the blockchain that provide faster transaction transmission speeds.

4. The computer-implemented method of claim 3, further comprising determining, for a given transmission-sending node and based on the transmission speed statistics, a set of preferred nodes to which transactions are to be sent.

5. The computer-implemented method of claim 1, wherein a blockchain transaction acceleration system is implemented in one or more nodes in the blockchain or in a server accessible by the blockchain.

6. The computer-implemented method of claim 1, further comprising determining a plurality of intermediate nodes to use for sending the at least one second transaction.

7. A non-transitory, computer-readable medium storing one or more instructions executable by a computer system to perform operations comprising:
   receiving, by a second node in a blockchain, a first transaction sent by a first node in the blockchain;
   receiving, by at least one intermediate node in the blockchain, at least one second transaction that is a duplicate of the first transaction, wherein the at least one second transaction is sent by the first node to the at least one intermediate node that is different from the second node;
   transmitting the at least one second transaction from the at least one intermediate node to the second node;
   executing, by the second node, a first-received transaction that is received earliest among received transactions, wherein the received transactions include the first transaction and the at least one second transaction, wherein the first transaction and the at least one second transaction arrive over at least two communication paths, and wherein the first-received transaction arrives over a fastest communication path of the at least two communication paths; and
   upon determining, by the second node, that remaining transactions of the received transactions are identical to the first-received transaction, discarding the remaining transactions of the received transactions, wherein determining that the remaining transactions of the received transactions are identical to the first-received transaction includes identifying a digital signature of each of the remaining transactions of the received transactions that matches a digital signature of the first-received transaction.

8. The non-transitory, computer-readable medium of claim 7, wherein the first node in the blockchain and the second node in the blockchain are within different network hubs provided by different network service providers.

9. The non-transitory, computer-readable medium of claim 7, wherein the operations further comprise collecting transmission speed statistics on the received transactions to determine nodes in the blockchain that provide faster transaction transmission speeds.

10. The non-transitory, computer-readable medium of claim 9, wherein the operations further comprise determining, for a given transmission-sending node and based on the transmission speed statistics, a set of preferred nodes to which transactions are to be sent.

11. The non-transitory, computer-readable medium of claim 7, wherein a blockchain transaction acceleration system is implemented in one or more nodes in the blockchain or in a server accessible by the blockchain.

12. The non-transitory, computer-readable medium of claim 7, wherein the operations further comprise determining a plurality of intermediate nodes to use for sending the at least one second transaction.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, by a second node in a blockchain, a first transaction sent by a first node in the blockchain;

receiving, by at least one intermediate node in the blockchain, at least one second transaction that is a duplicate of the first transaction, wherein the at least one second transaction is sent by the first node to the at least one intermediate node that is different from the second node;

transmitting the at least one second transaction from the at least one intermediate node to the second node;

executing, by the second node, a first-received transaction that is received earliest among received transactions, wherein the received transactions include the first transaction and the at least one second transaction, wherein the first transaction and the at least one second transaction arrive over at least two communication paths, and wherein the first-received transaction arrives over a fastest communication path of the at least two communication paths; and upon determining, by the second node, that remaining transactions of the received transactions are identical to the first-received transaction, discarding the remaining transactions of the received transactions, wherein determining that the remaining transactions of the received transactions are identical to the first-received transaction includes identifying a digital signature of each of the remaining transactions of the received transactions that matches a digital signature of the first-received transaction.

14. The computer-implemented system of claim 13, wherein the first node in the blockchain and the second node in the blockchain are within different network hubs provided by different network service providers.

15. The computer-implemented system of claim 13, wherein the operations further comprise collecting transmission speed statistics on the received transactions to determine nodes in the blockchain that provide faster transaction transmission speeds.

16. The computer-implemented system of claim 15, wherein the operations further comprise:

determining, for a given transmission-sending node and based on the transmission speed statistics, a set of preferred nodes to which transactions are to be sent.

17. The computer-implemented system of claim 13, wherein a blockchain transaction acceleration system is implemented in one or more nodes in the blockchain or in a server accessible by the blockchain.

* * * * *